April 26, 1949. G. H. S. HOLMSTRÖM 2,468,495
FOLDABLE BABY CARRIAGE AND THE LIKE
Filed July 28, 1947

INVENTOR.
G. H. S. Holmström
BY

Patented Apr. 26, 1949

2,468,495

UNITED STATES PATENT OFFICE 2,468,495

FOLDABLE BABY CARRIAGE AND THE LIKE

Georg Henry Sixten Holmström,
Goteborg, Sweden

Application July 28, 1947, Serial No. 764,179
In Sweden September 3, 1946

8 Claims. (Cl. 280—39)

1

My invention relates to foldable baby carriages and the like which are provided with a body of stiff material as sheet metal, wood, fibre, basket work and such like.

The principal object of my invention is the provision of a foldable baby carriage with a body of stiff material and an extremely simple folding mechanism.

Another object of the invention is a foldable baby carriage where a lowering of the whole body towards the wheel axles is effected by a simple folding of the side walls of the body.

Other objects and advantages of the invention relating to the particular arrangement and construction of the various parts will become apparent as the description proceeds.

Referring in detail to the different parts of the baby carriage this comprises a body of stiff material including side walls 7 and a bottom, the latter consisting of a frame 1 with a seat 2. The side walls are connected to the bottom by means of hinges 8, so that the side walls can be folded inwardly towards the bottom.

Figure 3:
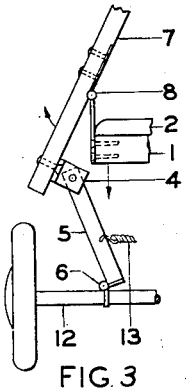
Fig. 3 is an enlarged fragmentary end view of the one side portion of the baby carriage with the parts in a middle position of a folding movement.
Figure 4:
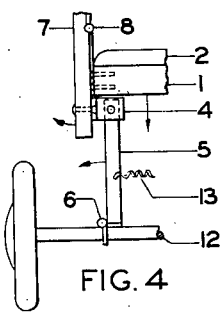
Fig. 4 is the same fragmentary end view as in Fig. 3 with the parts in upright position.
Figure 5:
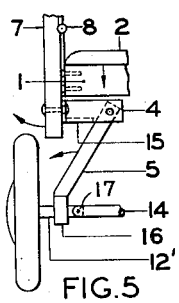
Fig. 5 is an enlarged fragmentary end view like the one in Fig. 4 but in another embodiment.
Figure 6:
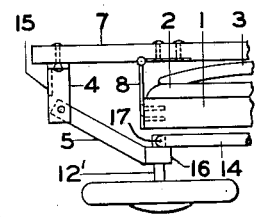
Fig. 6 is the same end view as in Fig. 5 with the parts in folded position.

Each side wall has a portion 4 underlying the bottom at each end thereof and is pivotably connected to the upper end of a support arm 5 resting on the corresponding wheel axle 12. In this way the support arms carry the bottom 1, 2, underlying the same without being connected thereto. Coil springs 13 may preferably connect opposite support arms with each other as indicated in Figs. 3 and 4. Shoulders 15 on the side wall portions 4 may prevent the support arms 5 to swing outwardly in reference to the side walls, as shown in Figs. 5 and 6. The carriage has a back 3 foldable towards the bottom 1, 2, as well as a push handle in the shape of a bow 9, 9', the legs of which are guided in pipes 11, 11' preferably open in both ends, so that the long handle legs can be pushed through the pipes when the

2 baby carriage is in folded position. The pipes are swingably mounted to the bottom and movable outside of the upright side walls where the pipes coact in known manner with locking means 10, 10', also being a help to hold the side walls in upright position. 9', 11' designate an alternative position of the push handle.

According to the invention the support arms 5 are movable sideways in reference to the bottom 1, 2. In the construction shown in Figs. 1-4 the support arms are swingably mounted to the wheel axles 12 by means of hinges 6. As a result of this construction the support arms will swing outwards sideways when the side walls are folded as seen in Fig. 4. The portion 4 of the side wall underlying the bottom as well as the upper end of the support arm will swing out of the way of the bottom at the folding of the side walls, and the bottom together with the side walls will be lowered to the position in Fig. 2. The coil springs 13 are a help to bring the carriage to its extended position.

In the modification shown in Figs. 5 and 6 the wheels are mounted on short axle pins 12' and the support arms 5 are rigidly fixed to these axle pins at 16. Opposite axle pins are at 17 pivotably connected to a common between-axle rod 14.

Also in this modification the side wall portion 4 as well as the upper end of the support arm 5 pivotably connected to said portion 4 and underlying the bottom 1, 2 will swing out of the way of the bottom at the folding of the side walls, and at this movement the bottom with the side walls will be lowered towards the between-axle rods 14. At the same time the wheels will be swung up towards the bottom as seen in Fig. 6. If desired, coil springs may also in this modification connect opposite support arms, although this is not shown in the Figures 5 and 6.

Figure 1:
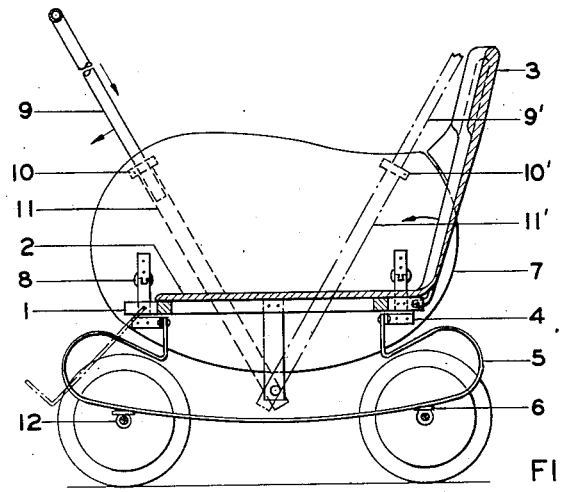
Fig. 1 is a longitudinal section view of the baby carriage in its extended state.
Figure 2:
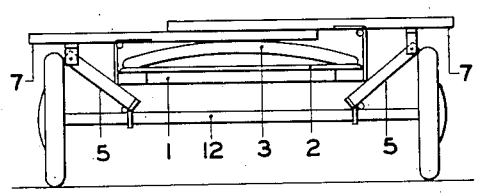
Fig. 2 is an end view of the same with its parts folded together.

The support arms 5 may be constructed as rigid arms, but in the preferred embodiment the support arms are formed as carriage springs as seen in Fig. 1. Preferably the support arms have in all cases such an inclination as shown in Fig. 5 with the upper connection situated more inwards than the lower one. The advantage hereof is that the downpressing of the bottom 1, 2 against the said upper connection will hold and lock the support arms in right position. Also the back 3, when placed between the side walls as seen in Fig. 1, can be used to lock the side walls in upright position. In the construction shown in the drawing the back 3 as well as the push handle 9, 9' must be moved down previous to the folding of the side walls. In placing the back more forward the construction naturally can be altered in such a way that the side walls can be folded previous to the moving down of the back.

Although preferred embodiments of my invention have been illustrated it will be understood that modifications may be made within the spirit and scope of the appended claims.

I claim:

1. A baby carriage comprising a body of stiff material including side walls and a bottom, wheel axles, support arms resting on the wheel axles and underlying and carrying the bottom without being connected thereto, each side wall hinged to the bottom and a lower portion of the side wall beneath the bottom pivotably connected to the upper portion of the corresponding support arms, and the bottom being lowerable as well as the support arms movable sideways by a folding movement of the side walls.

2. A baby carriage comprising a body of stiff material including side walls and a bottom, wheel axles, support arms resting on the wheel axles and underlying and carrying the bottom without being connected thereto, each side wall hinged to the bottom and a lower portion of the side wall beneath the bottom pivotably connected to the upper portion of the corresponding support arm, the bottom being lowerable as well as the support arms movable sideways by a folding movement of the side walls, and the support arms being directed upwards with an inclination inwards and locked in this position by the downpressing of the bottom.

3. A baby carriage comprising a body of stiff material including side walls and a bottom, wheel axles, support arms resting on the wheel axles and underlying and carrying the bottom without being connected thereto, each side wall hinged to the bottom and a lower portion of the side wall beneath the bottom pivotably connected to the upper portion of the corresponding support arm, the bottom being lowerable as well as the support arms movable sideways by a folding movement of the side walls, and the support arms being swingably mounted on the wheel axles.

4. A baby carriage comprising a body of stiff material including side walls and a bottom, wheel axles, support arms resting on the wheel axles and underlying and carrying the bottom without being connected thereto, each side wall hinged to the bottom and a lower portion of the side wall beneath the bottom pivotably connected to the upper portion of the corresponding support arm, the bottom being lowerable as well as the support arms movable sideways by a folding movement of the side walls, the support arms being swingably mounted on the wheel axles, and the support arms being formed as carriage springs.

5. A baby carriage comprising a body of stiff material including side walls and a bottom, wheel axles, support arms resting on the wheel axles and the underlying and carrying the bottom without being connected thereto, each side wall hinged to the bottom and a lower portion of the side wall beneath the bottom pivotably connected to the upper portion of the corresponding support arm, the bottom being lowerable as well as the support arms movable sideways by a folding movement of the side walls, the support arms being swingably mounted on the wheel axles and formed as carriage springs, and a coil spring connecting opposite support arms.

6. A baby carriage comprising a body of stiff material including side walls and a bottom, wheel axles, support arms resting on the wheel axles and underlying and carrying the bottom without being connected thereto, each side wall hinged to the bottom and a lower portion of the side wall beneath the bottom pivotably connected to the upper portion of the corresponding support arm, the bottom being lowerable as well as the support arms movable sideways by a folding movement of the side walls, each wheel axle including a short axle pin and a carriage wheel mounted on the short axle pin, and the support arms being rigidly attached to the axle pins.

7. A baby carriage comprising a body of stiff material including side walls and a bottom, wheel axles, support arms resting on the wheel axles and underlying and carrying the bottom without being connected thereto, each side wall hinged to the bottom and a lower portion of the side wall beneath the bottom pivotably connected to the upper portion of the corresponding support arm, the bottom being lowerable as well as the support arms movable sideways by a folding movement of the side walls, each wheel axle including a short axle pin and a carriage wheel mounted on the short axle pin, and the support arms being rigidly attached to the axle pins and formed as carriage springs.

8. A baby carriage comprising a body of stiff material including side walls and a bottom, wheel axles, support arms resting on the wheel axles and underlying and carrying the bottom without being connected thereto, each side wall hinged to the bottom and a lower portion of the side wall beneath the bottom pivotably connected to the upper portion of the corresponding support arm, the bottom being lowerable as well as the support arms movable sideways by a folding movement of the side walls, each wheel axle including a short axle pin and a carriage wheel mounted on the short axle pin, an axle rod having its ends pivotally connected to opposite axle pins, and the support arms being rigidly mounted on the axle pins.

GEORG HENRY SIXTEN HOLMSTRÖM.

REFERENCES CITED

The following references are of record in the file of this patent:

UNITED STATES PATENTS

| Number | Name | Date |
|---|---|---|
| 2,419,023 | Holstrom | Apr. 15, 1947 |
| 2,436,643 | Hafner | Feb. 24, 1948 |